March 20, 1962 E. MAYER 3,026,112
SLIDE RING SEAL
Filed Nov. 2, 1959 2 Sheets-Sheet 1
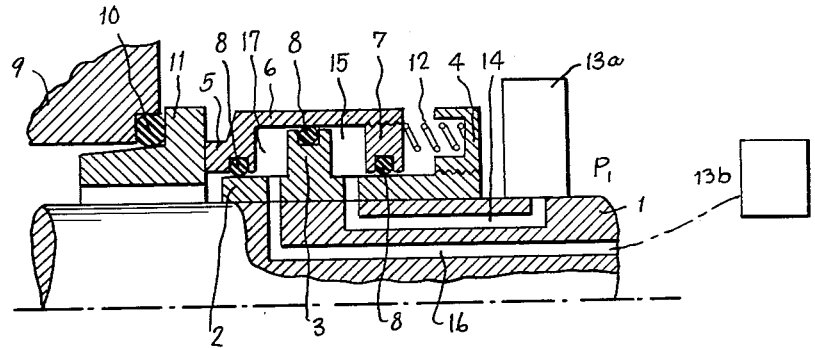
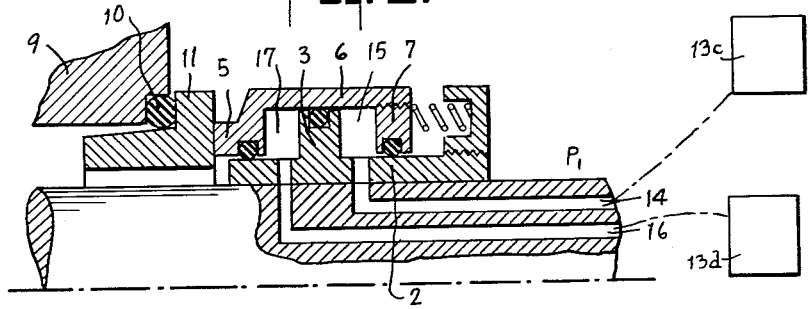
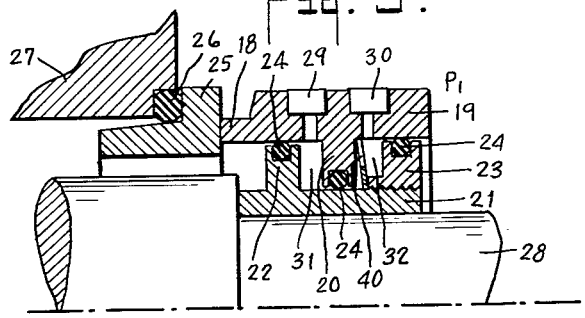
INVENTOR:
EHRHARD MAYER
BY Robert Henderson
ATTORNEY INVENTOR:
EHRHARD MAYER
BY Robert Henderson
ATTORNEY

United States Patent Office 3,026,112
Patented Mar. 20, 1962

3,026,112
SLIDE RING SEAL
Ehrhard Mayer, Palmyra, N.Y., assignor to Garlock Inc., a corporation of New York
Filed Nov. 2, 1959, Ser. No. 850,171
Claims priority, application Germany Nov. 10, 1958
9 Claims. (Cl. 277—3)

This invention relates to a seal for revolving shafts, wherein a face of a slide ring rests against a machine part to be sealed.

In known slide ring seals, the slide ring is made tight against the shaft by an elastic packing, while spring action thrusts it axially against its bearing surface. In this way, leakage is avoided even when the shaft is stationary. For seals in service, the practice also exists of utilizing the pressure of the medium to be sealed off to hold the slide ring in position, by transmitting the pressure to the back of the slide ring. By fixing a sleeve on the shaft, a pressure chamber has been formed between the back of the ring and face of the sleeve on the one hand and the slide ring housing and shaft on the other hand, in which the pressure of the medium would build up. The slide ring with housing was axially movable relative to the stationary sleeve. A static seal was provided by elastic packing between the sleeve and the slide ring housing. Such seals have proved highly serviceable, but, with increasingly exacting requirements as to pressure, temperature and speed, they are not always suitable under varying loads.

Further, in slide ring seals for holding high pressures, relief of the slide surface of the ring has been provided by not transmitting all of the pressure to the back surface of the slide ring.

Proceeding from the prior art, the invention is based on the idea that it must be possible to adapt the pressure per unit area of the slide ring against its bearing surface to various operating conditions without dismantling the seal. According to the invention, it is proposed that, for subjecting the slide ring to and relieving it of load, pressure chambers, centrifugal governors and/or bimetallic elements controlled by pressure, temperature and/or speed be provided inside or outside the seal, whereby one and the same seal may be either loaded or relieved according to operating conditions. This has the advantage that under excessive pressure, relief of the slide ring will avoid undersirable evolution of heat at the point of friction, so that the intervening film of lubricant essential to the seal will be preserved and wear thereby kept within normal limits. Advantageously, pressure chambers between the axially movable part of the seal, for example the slide ring housing, and the stationary part, such as a sleeve fixed on the shaft, may be so arranged that the desired loading or relief of the slide ring will occur according to the pressure transmitted to one or the other chamber. The function of the seal is greatly affected by the arrangement of the radial chamber wall, wherefore, in further elaboration of the invention, it is proposed that the slide ring housing and the fixed sleeve each be connected with two radially directed walls to form the pressure chambers, in such manner that the chamber walls of one member embrace the chamber walls of the other member. If the chamber walls on the one hand belong to a common radial web forming a T-shaped cross-section together with its associated part, then the other two chamber walls with their associated part will form a U in cross-section, the U embracing the radially directed web of the T. The size of the chamber walls is also a factor in the specific pressure on the slide ring. Conceivably, the walls of the one chamber may be greater than those of the other chamber, so that the slide ring may be more intensively thrust into contact than relieved; on the other hand, if greater relief is wanted, the walls of the other chamber should be made larger. The several chambers may preferably be sealed with otherwise known round rubber rings accommodated in matching recesses.

The chambers are each connected to a pressure line in which valves are installed, controllable for example by means of centrifugal governors or thermally sensitive bimetallic elements. According to their nature, these control means may affect the contact pressure of the slide ring through rotational speed or through temperature. Means sensitive to temperature may advantageously be controlled by the temperature of the slide ring and/or by the temperature of the medium to be sealed off. Aside from automatic controls, the control means may likewise conceivably be actuated by an operator from without, for example from an operating station; the latter applies especially to agitator seals of major size.

It is likewise especially advantageous to provide the pressure lines in the part of the seal fixedly attached to the shaft, in order to avoid moving parts to a large extent. Whether the pressure lines pass through the shaft or through the machine part to be sealed is not essential to the invention.

The invention likewise embraces control means functioning without pressure change. In particular, centrifugal governors and bimetallic elements have proved effective. The centrifugal governor may be located inside or outside the seal, and may reduce or augment the contact pressure of the slide ring with increasing speed. When bimetallic elements are used, for example an expansion chamber, the arrangement is preferably such that the slide ring is relieved with rising temperature of the medium and/or slide ring, owing to the expanding tendency of the bimetallic chamber. Finally, thermostatic controls may alternatively be installed to relieve or load the slide ring. Readily expansible, fluid-filled bellows units are contemplated particularly.

In the drawings, the invention is illustrated by examples of embodiments, viz.:

FIGS. 1 and 2 show a slide ring seal with passages inside the shaft;

FIG. 3 shows a slide ring seal in which the control means are installed in the slide ring housing;

Figure 4:
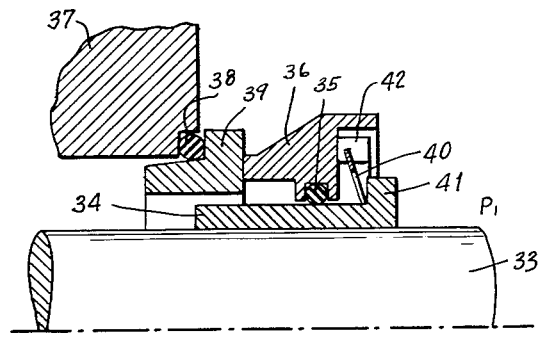
FIG. 4 shows a slide ring seal with centrifugal governor.

In FIG. 1, shaft 1 is fitted with a fixed sleeve 2. Sleeve 2 is integral with radial webs 3, 4. Slide ring 5 surrounds sleeve 2 with housing 6. Housing 6 is closed off by plate 7. Between the moving parts, round rubber rings 8 are provided for elastic packing. Slide ring 5 is in contact with a bearing ring 11 set in machine part 9 with interposition of a round rubber ring 10. The slide ring seal is arranged inside the pressure space, so that the full pressure of medium $p_1$ can act on the back surface of plate 7. Thus the specific pressure of slide ring 5 is increased as a function of the outside diameter of slide ring 5. This load is reinforced by spring 12, resting in a recess of web 4, a plurality of such springs being equidistantly spaced about the sleeve 2.

Relief of slide ring 5 from pressure $p_1$ is possible if control means 13a admits pressure through passage 14 to chamber 15. Control means 13a is arranged inside the pressure space. Additional loading of slide ring 5 is possible by additional control means 13b, located outside the slide ring seal and the space to be sealed off, pressure being admitted from the additional control means through passage 16 to chamber 17. According to the operating condition, the specific pressure of slide ring 5 may be either increased or decreased, by transmitting pressure into chamber 15 or chamber 17. Each of control means 13a and 13b, according to the invention, may be actuated in response to pressure, temperature of the medium to be sealed off, or centrifugal force.

A similar embodiment is represented in FIG. 2. Here again, the slide ring seal is located in the pressure space, so that the pressure $p_1$ additionally loads the slide ring 5. The control lines 14, 16, however, are both routed outside the pressure space, to suitable separate control means 13c and 13d so that it is alternatively possible for them to be actuated by an operator. As in the case of the slide ring seal in FIG. 1, the slide ring 5, housing 6 and plate 7 again form a U in cross-section, embracing the web 3 of sleeve 2.

The slide ring seal of FIG. 3 consists of a slide ring 18 and its housing 19, on which a radial web 20 is arranged, embraced by the two webs 22, 23 belonging to the sleeve 21. Web 23 is a plate screwed onto sleeve 21. The movable parts are again made tight against each other by means of round rubber rings 24. Between plate 23 and web 20, a spring washer 40 is inserted, pressing slide ring 18 against bearing ring 25, which in turn is set in housing 27 with interposition of round rubber ring 26. Sleeve 21 is fixed on shaft 28. In housing 19, control means 29, 30 are installed, communicating through passages with chambers 31, 32, and able as desired to transmit the pressure $p_1$ from the space to be sealed off into the chamber, whereby an application of or relief from pressure may be achieved.

A slide ring seal of simple construction is represented in FIG. 4. The sleeve 34 mounted on shaft 33 is surrounded by slide ring 36 with interposition of round rubber ring 35. Slide ring 36 presses against bearing ring 39, which in turn is set in housing 37 with interposition of round rubber ring 38. Slide ring 36 is held in contact with ring 39 by spring washer 40, bearing on shoulder 41 of sleeve 34. At its free end, spring washer 40 has a part 42 tending to step down the axial force of the spring 40 at high rotational speed, so that only the pressure $p_1$ of the medium will continue to load the back surface of the slide ring.

Figure 5:
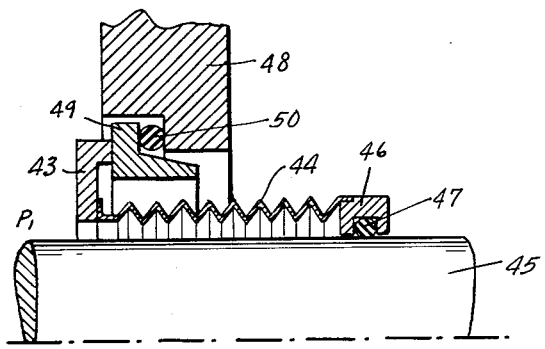
FIG. 5 shows a variant with bimetallic bellows.

FIG. 5 shows a slide ring seal wherein slide ring 43 is connected by a bimetallic bellows 44 to shaft 45. Between shaft 45 and bimetallic bellows 44, a collar 46 is provided, sealed by a round rubber ring 47. In machine part 48, bearing ring 49 rests against a round rubber ring 50. With rising temperature of slide ring 43 and hence also of bellows 44, the latter expands, thus relieving the bearing surface of slide ring 43.

I claim:
1. A slide ring seal for effecting a seal between two coaxial, relatively rotatable machine elements, said seal comprising a slide ring having an annular, front end surface adapted to effect a sliding seal with an annular bearing surface of one of said elements, and an integral cylindrical housing member; and a cylindrical sleeve member in fixed, sealed association with the other of said elements; said housing member and sleeve member having spaced, opposed cylindrical surface portions which are of uniform diameter on each of said members, one of said members having an integral radial web extending into slidable, sealed engagement with said cylindrical surface portions of the other of said members, said other of said members having a pair of integral walls extending, in spaced relation to opposite sides of said web, into slidable, sealed engagement with said cylindrical surface portions of said one of said members, thereby providing separate, closed, oppositely acting pressure chambers having equal, radial, pressure receiving surface areas at opposite sides of said web, one of said members being formed with separate passages in communication with said chambers and adapted to introduce fluid separately into the latter, and said seal further comprising separate pressure-control means connected to said passages to control separately the pressure of fluid thus introduced to said chambers.

2. A slide ring seal according to claim 1, said passages being in said sleeve member.

3. A slide ring seal according to claim 1, said passages being in said housing member.

4. A slide ring seal according to claim 3, said pressure-control means being carried by said housing member.

5. A slide ring seal according to claim 1, said sleeve member having an integral flange toward its back end, and said seal including spring means compressed between said flange and said slide ring to urge the latter forwardly toward said bearing surface; said slide ring being adapted to be urged rearwardly against the force of said spring means, by fluid pressure in one of said chambers predominant over fluid pressure in the other of said chambers.

6. A slide ring seal according to claim 1, one of said separate pressure control means being disposed within a sealed fluid-occupied space, between the two machine elements, in controlling relation to fluid in one of said passages.

7. A slide ring seal according to claim 1, one of said elements being a machine casing, the other of said elements being a shaft extending through a shaft opening in said casing, said passages being in said sleeve member, and said shaft having ducts interconnecting said passages and said pressure-control means.

8. A slide ring seal according to claim 1, one of said separate pressure-control means being carried by the one of said members which is formed with said separate passages and being connected to one of said passages.

9. A slide ring seal according to claim 1, said separate pressure-control means being carried by the one of said members which is formed with said separate passages and being connected separately to said passages.

References Cited in the file of this patent
UNITED STATES PATENTS

| | | |
|---|---|---|
| 2,556,393 | Holben | June 12, 1951 |
| 2,805,090 | Creek | Sept. 3, 1957 |
| 2,860,895 | Mosbacher | Nov. 18, 1958 |
| 2,898,133 | Mirza | Aug. 4, 1959 |